United States Patent
Wang et al.

(10) Patent No.: US 10,694,001 B2
(45) Date of Patent: Jun. 23, 2020

(54) METHOD, APPARATUS AND SYSTEM FOR UPLOADING A FILE

(71) Applicant: Beijing Xiaomi Mobile Software Co., Ltd., Haidian District, Beijing (CN)

(72) Inventors: Xi Wang, Beijing (CN); Weiwei Wang, Beijing (CN); Ran Xie, Beijing (CN); Haiyang Yi, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 128 days.

(21) Appl. No.: 15/654,305

(22) Filed: Jul. 19, 2017

(65) Prior Publication Data
US 2018/0034940 A1   Feb. 1, 2018

(30) Foreign Application Priority Data

Jul. 27, 2016  (CN) .......................... 2016 1 0604844

(51) Int. Cl.
*H04L 29/06*  (2006.01)
*G06F 16/13*  (2019.01)
(Continued)

(52) U.S. Cl.
CPC .............. *H04L 67/42* (2013.01); *G06F 16/13* (2019.01); *G06F 16/174* (2019.01);
(Continued)

(58) Field of Classification Search
CPC ..... H04L 67/42; H04L 67/1002; H04L 67/06; H04L 29/06027; G06F 16/13; G06F 16/174

See application file for complete search history.

(56) References Cited

U.S. PATENT DOCUMENTS 9,104,687 B2 * 8/2015 Euresti ................. G06F 16/174
9,613,047 B2 * 4/2017 Sydell ................... G06F 16/182
(Continued)

FOREIGN PATENT DOCUMENTS

CN         1710857 A    12/2005
CN       101771671 A     7/2010
(Continued)

OTHER PUBLICATIONS

Extended European Search Report issued in corresponding EP Application No. EP17155952.9, dated Nov. 8, 2017, 9 pages.
(Continued)

*Primary Examiner* — Todd L Barker
(74) *Attorney, Agent, or Firm* — Arch & Larke LLP

(57) ABSTRACT

Methods, apparatuses, and systems are provided for uploading a file in the field of computer technology. The method includes a router receiving a target file for uploading to a target server which is transmitted from a terminal; determining a feature value of the target file; obtaining a list of feature values of files for the target server, in which the feature value of each file stored in the target server is recorded; transmitting the target file to the target server, when the feature value of the target file is not in the list of feature values of files; and transmitting the feature value of the target file to the target server, when the feature value of the target file is in the list of feature values of files.

10 Claims, 6 Drawing Sheets

(51) Int. Cl.
*G06F 16/174* (2019.01)
*H04L 29/08* (2006.01)

(52) U.S. Cl.
CPC .... *H04L 29/06027* (2013.01); *H04L 67/1002* (2013.01); *H04L 67/2852* (2013.01); *H04L 67/06* (2013.01)

(56) References Cited

U.S. PATENT DOCUMENTS

| | | | |
|---|---|---|---|
| 2002/0059451 A1* | 5/2002 | Haviv | H04L 45/00 709/238 |
| 2004/0236803 A1 | 11/2004 | Spiegeleer | |
| 2011/0087690 A1 | 4/2011 | Cairns | |
| 2012/0011272 A1* | 1/2012 | Tanigawa | H04L 67/06 709/236 |
| 2014/0082154 A1 | 3/2014 | Lin | |
| 2014/0122451 A1 | 5/2014 | Euresti et al. | |
| 2015/0189118 A1* | 7/2015 | Ogata | H04N 1/32101 348/231.3 |
| 2016/0057201 A1* | 2/2016 | Xu | H04L 67/10 709/219 |
| 2017/0161637 A1* | 6/2017 | Misra | G06F 16/313 |

FOREIGN PATENT DOCUMENTS

| | | | | |
|---|---|---|---|---|
| CN | 101867777 A | 10/2010 | | |
| CN | 101917569 A | 12/2010 | | |
| CN | 102693388 A | 9/2012 | | |
| CN | 102739791 A | 10/2012 | | |
| CN | 103841170 A | 6/2014 | | |
| CN | 104270474 A | 1/2015 | | |
| CN | 104836862 A | 8/2015 | | |
| CN | 105376277 A | 3/2016 | | |
| CN | 105577712 A | 5/2016 | | |
| KR | 20090003405 | * | 1/2009 | G06F 15/16 |

OTHER PUBLICATIONS

Chinese Office Action (including English translation) issued in corresponding CN Patent Application No. 201610604844.6, dated Dec. 27, 2018, 31 pages.

* cited by examiner

METHOD, APPARATUS AND SYSTEM FOR UPLOADING A FILE

CROSS-REFERENCE TO RELATED APPLICATION

This application is based on and claims priority to Chinese Patent Application No. 201610604844.6 filed on Jul. 27, 2016, which is incorporated herein by reference in its entirety.

FIELD

The present disclosure generally relates to computer technology, and in particular to method, apparatus and system for uploading a file.

BACKGROUND

With the development of network information technology, more and more users are accustomed to store files in their work and life on the network side for backup.

When uploading a file to a server for backup, a user may firstly select the corresponding file on a terminal, and click a function button for uploading a file. At the same time the terminal may transmit the corresponding file to the server. After receiving the file, the server may store it in a storage space corresponding to the user.

In the process of implementing the present disclosure, the inventor finds that there is at least the following problem: if a certain file already exists in the server and a user uploads the file repeatedly, the resource for file transmission of the server will be greatly wasted.

SUMMARY

In view of the fact in prior art, a method, apparatus and system for uploading a file are provided in the present disclosure. The technical solutions are described as follows.

According to a first aspect of the present disclosure, a method for uploading a file is provided, which may be implemented in a router. In the method, the router determines a feature value of the target file; obtains a list of feature values of files for the target server, in which the feature value of each file stored in the target server is recorded. The router transmits the target file to the target server, when the feature value of the target file is not in the list of feature values of file. The router transmits the feature value of the target file to the target server, when the feature value of the target file is in the list of feature values of files.

According to a second aspect of the present disclosure, a method for uploading a file is provided, which may be implemented in a target server. In the method, storing a target file and recording the target file as an uploading file of a login account of a terminal when the target server receives the target file transmitted by a router; and recording a target file which is already stored in the target server as the uploading file of the login account of the terminal when the target server receives a feature value of the target file transmitted by the router.

According to a third aspect of the present disclosure, a router is provided, which may include: a receiver configured to receive a target file for uploading to a target server which is transmitted from a terminal and determine a feature value of the target file; an obtaining module configured to obtain a list of feature values of files for the target server, in which the feature value of each file stored in the target server is recorded; and a transmitter configured to transmit the target file to the target server when the feature value of the target file is not in the list of feature values of files and transmit the feature value of the target file to the target server, when the feature value of the target file is in the list of feature values of files.

According to a fourth aspect of the present disclosure, a target server is provided, which may include: a recording module configured to store a target file and recording the target file as an uploading file of a login account of a terminal when the target server receives the target file transmitted by a router, and record a target file which is already stored in the target server as the uploading file of the login account of the terminal when the target server receives a feature value of the target file transmitted by the router.

According to a fifth aspect of the present disclosure, an apparatus for uploading a file is provided. The apparatus includes a processor; and a memory to store processor-executable instructions. The processor is configured to: receive a target file for uploading to a target server which is transmitted from a terminal; determine a feature value of the target file; obtain a list of feature values of files for the target server, in which the feature value of each file stored in the target server is recorded; transmit the target file to the target server, when the feature value of the target file is not in the list of feature values of files; and transmit the feature value of the target file to the target server, when the feature value of the target file is in the list of feature values of files.

According to a sixth aspect of the present disclosure, an apparatus for uploading a file is provided, which may include a processor; and a memory to store processor-executable instructions. The processor is configured to store a target file and record the target file as an uploading file of a login account of a terminal when a target server receives the target file transmitted by a router; and record a target file which is already stored in the target server as the uploading file of the login account of the terminal when the target server receives a feature value of the target file transmitted by the router.

According to a seventh aspect of the present disclosure, a system for uploading a file is provided. The system may include a terminal, a router, and a target server. The router is configured to receive a target file for uploading to a target server which is transmitted from a terminal, determine a feature value of the target file, obtain a list of feature values of files for the target server in which the feature value of each file stored in the target server is recorded, transmit the target file to the target server when the feature value of the target file is not in the list of feature values of files, transmit the feature value of the target file to the target server when the feature value of the target file is in the list of feature values of files; and the target server is configured to store a target file and record the target file as an uploading file of a login account of a terminal when a target server receives the target file transmitted by a router; and record a target file which is already stored in the target server as the uploading file of the login account of the terminal when the target server receives a feature value of the target file transmitted by the router.

It is to be appreciated that both the forgoing general description and the following detailed description are exemplary only, and are not restrictive of the present disclosure.

BRIEF DESCRIPTION OF THE DRAWINGS

The accompanying drawings, which are incorporated in and constitute a part of this specification, and illustrate embodiments consistent with the disclosure, together with the description, serve to explain the principles of the disclosure.

Explicit embodiments of the present disclosure are illustrated through the drawings above, which will be described in more detail in the following. The drawings and textual description are not intended to limit the scope of the present disclosure in any way, but rather to illustrate the concepts of the disclosure to one skilled in the art with reference to specific embodiments.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the present disclosure. Instead, they are merely examples of apparatuses and methods consistent with some aspects related to the present disclosure as recited in the appended claims.

A method for uploading a file is provided by embodiments of the present disclosure, which may be implemented by a terminal, a router, and a server together. The terminal may be any terminal with data transmission capability, such as a computer, a mobile phone, and so forth. An application program may be installed on the terminal, which may have file uploading capability. A processor, a memory and a data transmission unit may be disposed in the terminal. The processor may be used to process the procedure of uploading a file, the memory may be used to store the data required and generated in the following processing procedures, and the data transmission unit may be used to transmit the data generated in the following procedures. The router may be a router with data transmission capability, in which a processor, a memory and a data transmission unit are disposed, where the processor may be used to process the procedure of uploading a file, the memory may be used to store the data required and generated in the following processing procedures, and the data transmission unit may be used to transmit the data generated in the following procedures. The server may be a background server of the application program described above, in which a large number of files are stored. In this embodiment, a mobile phone is taken for an example of the terminal to make a detailed description for the present disclosure, and other conditions are similar, which are not to be repeated in this embodiment.

Figure 2A:
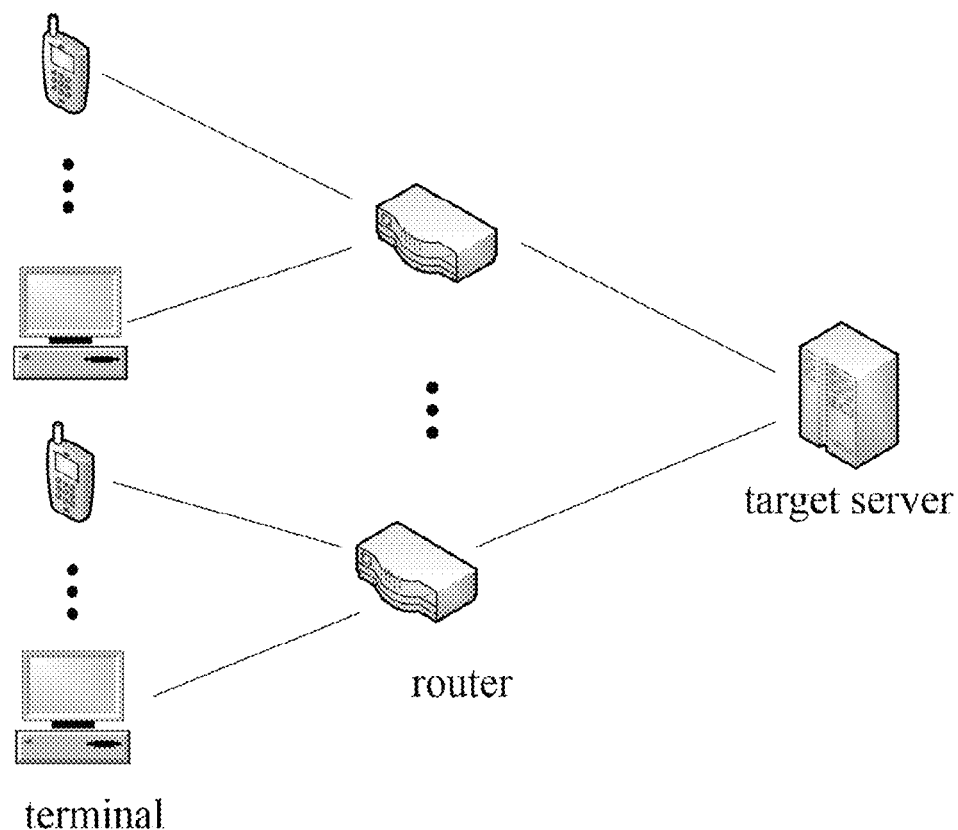
FIG. 2A is a schematic frame work diagram illustrating a system for uploading a file according to an exemplary embodiment.
Figure 2B:
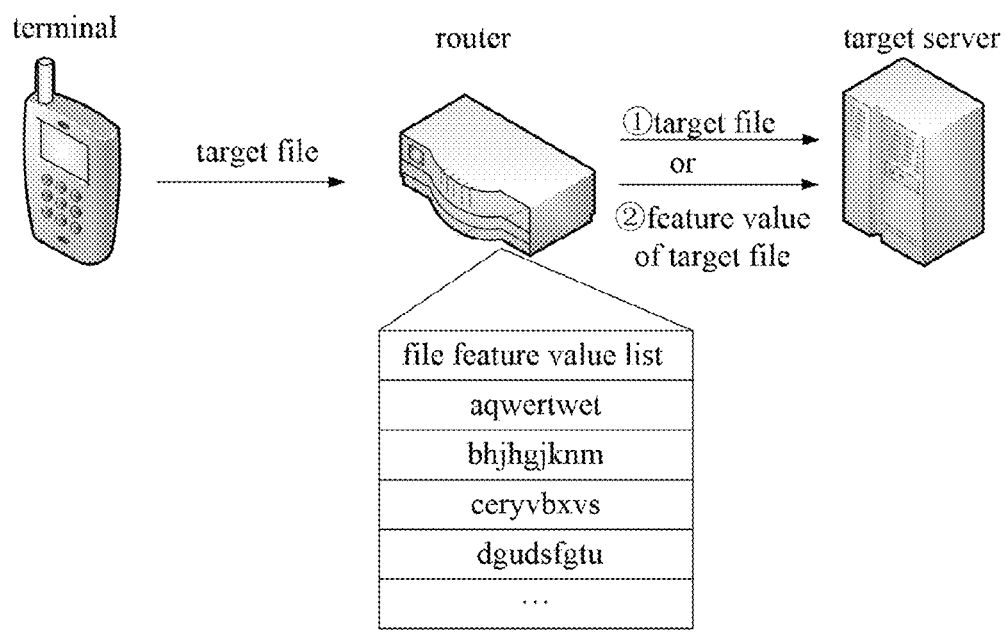
FIG. 2B is a schematic diagram illustrating a system interaction according to an exemplary embodiment.

The system framework of the present disclosure is shown in FIG. 2A, and an example interaction process is shown in FIG. 2B.

Figure 1:
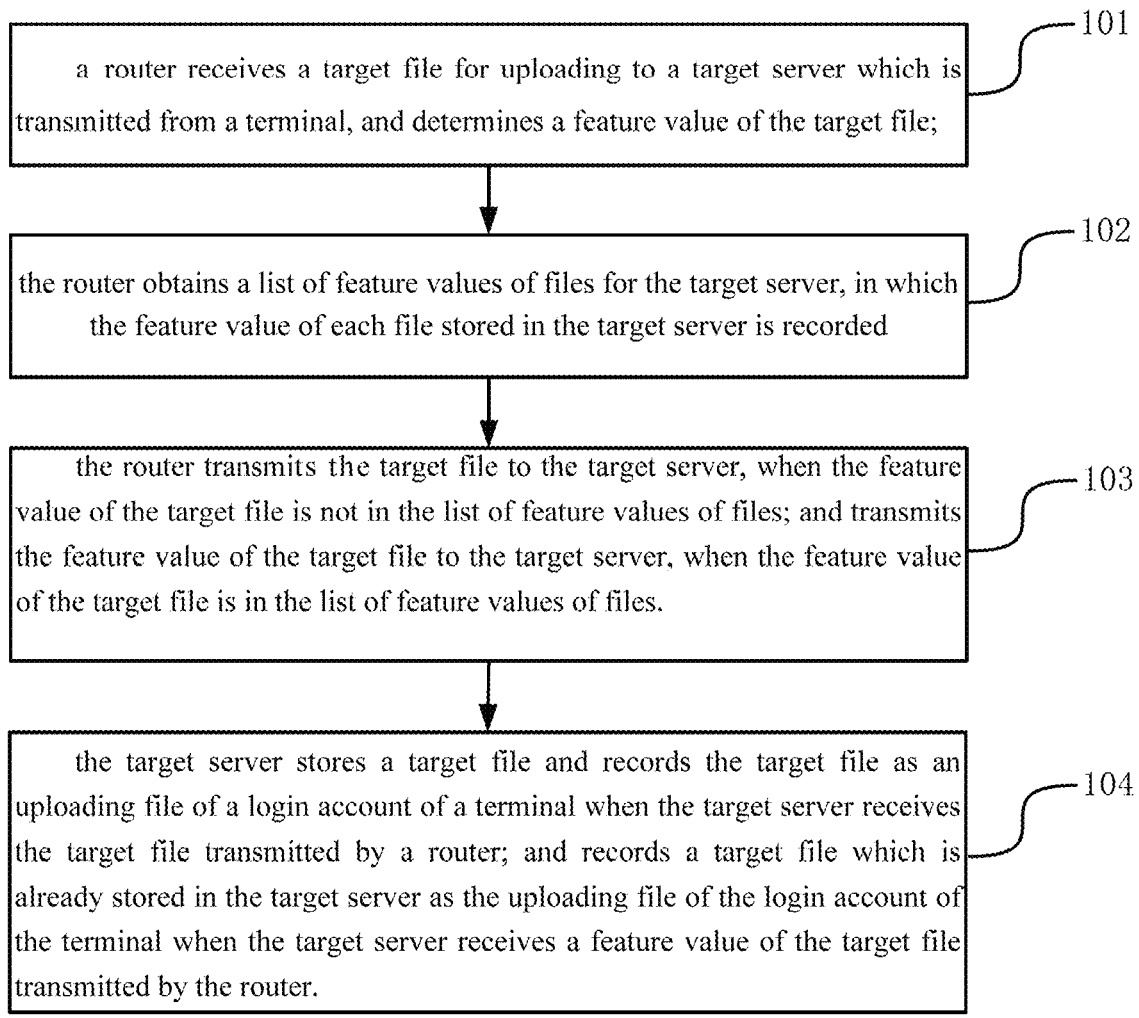
FIG. 1 is a flow chart illustrating a method for uploading a file according to an exemplary embodiment.

A detailed description of the process flow shown in FIG. 1 will be made in incorporation with specific implementations as follows.

At step 101, a router receives a target file for uploading to a target server which is transmitted from a terminal, and determines a feature value of the target file.

The feature value may be a value set by the server to identify the file, which may be a hash value or a file name or the like. The feature value may be a unique value that corresponds to the file according to a predetermined feature extraction method.

For example, in some embodiments, the hash algorithm maps a binary value of any length to a smaller binary value of a fixed length, where smaller binary value of the fixed length is the hash value. Different files (even the same file name) correspond to different hash values. For the same file, the corresponding hash value changes when different encryptions or different random number formulas are adopted. The different encryption algorithm may include one or more of MD5, HMA, SHA and so on.

The size of the file is strongly related to the eigenvalue. Generally, if there is any difference between two files, their corresponding hash values are different. Feature may be calculated not only using hash-based algorithms, but also using other similar algorithms for differentiating or identifying files.

In one or more embodiments, an application program may be installed in the terminal. A user may upload a certain application file (i.e. the target file) to the target server corresponding to the application program using the terminal. In the process of uploading the file, the terminal keeps a data connection to the server through the router. After selecting the target file to be uploaded on the terminal, a user clicks an upload button, and then the terminal will transmit the target file to the router. Then the router may accordingly receive the target file for uploading to the target server which is transmitted from the terminal and determine the feature value of the target file. Here, the feature value of the target file may be obtained directly by the router after it is determined by the terminal, or determined by the router itself according to a property of the target file.

At step 102, the router obtains a list of feature values of files for the target server, in which the feature value of each file stored in the target server is recorded.

In one or more embodiments, a large number of files may be stored in the target server, each of which has a unique feature value. A list of feature values of files may be generated in the target server to record the feature values of all files stored in the target server. Furthermore, for the same files uploaded from different terminals, the feature values of the files are the same, and accordingly only one copy of the file is stored in the target server. After receiving the target file transmitted by the terminal and determining the feature value of the target file, the router may obtain the list of feature values of files for the target server.

Alternatively, there are various approaches for the router to obtain the list of feature values of files for the target server, and two feasible ways are given as follows.

In the first approach, the router obtains a locally stored list of feature values of files for the target server.

In this embodiment, the router may transmit a request for obtaining the list of feature values of files to the target server, or the target server may transmit the list of feature values of files to the router proactively, and the router may store the list of feature values of files locally after obtaining it. After receiving the target file which is transmitted from the terminal to the target server, the router may obtain the locally stored list of feature values of files for the target server if it is required to lookup the history of uploading of the target file.

Alternatively, for the situation that the list of feature values of files for the target server is already stored in the router, two implementations for updating the list of feature values of files are given as follows.

In the first implementation, when a list of feature values of files stored in the target server is updated, the target server transmits the updated list of feature values of files to the router. When receiving the list of feature values of files transmitted by the target server, the router updates the locally stored list of feature values of files according to the list of feature values of files transmitted by the target server.

In an embodiment, the lists of feature values of files in the target server and in the router may be maintained in a real-time synchronization. When the list of feature values of files stored in the target server is updated, namely, the list of feature values of files has changed after one or more target files are newly stored in the target server, the target server may transmit the updated list of feature values of files to the router. After receiving the list of feature values of files transmitted by the target server, the router may update the locally stored list of feature values of files according to the received list of feature values of files.

In the second implementation, the target server may transmit a latest list of feature values of files to the router every pre-defined time period. When receiving the list of feature values of files transmitted by the target server, the router may update the locally stored list of feature values of files according to the list of feature values of files transmitted by the target server.

In one or more embodiments, the target server may periodically transmit a latest list of feature values of files to the router, and the period may be determined by the update of the list of feature values of files in the target server. When the list of feature values of files in the target server is updated faster, a shorter pre-defined time period may be set. Then after receiving the list of feature values of files transmitted by the target server, the router may update the locally stored list of feature values of files according to the received list of feature values of files.

After receiving the target file uploaded by the router, the target server may record a network address of the router. Therefore, when the list of feature values of files in the target server is updated, the list of feature values of files may be transmitted to each router according to the network address of the router.

In the second approach, the router downloads a latest list of feature values of files from the target server.

In an embodiment, after receiving the target file transmitted from the terminal to the target server, the router may transmit a request for obtaining a list of feature values of files to the target server. Then, the target server may transmit the latest list of feature values of files to the router.

At step 103, the router transmits the target file to the target server, when the feature value of the target file is not in the list of feature values of files; and transmits the feature value of the target file to the target server, when the feature value of the target file is in the list of feature values of files.

In an embodiment, after obtaining the list of feature values of files for the target server, the router may look up the list for the feature value of the target file uploaded from the terminal to the server. When the feature value of the target file is not in the list of feature values of files, it means the target file is not stored in the target server, and then the router may transmit the target file to the target server. When the feature value of the target file is in the list of feature values of files, it means the target file is already stored in the target server, and then the router may only transmit the feature value of the target file to the target server, without uploading the target file again.

Alternatively or additionally, the router may also update the locally stored list of feature values of files while uploading the file. Accordingly, a part of processing at step 103 may be as follows: the router adds the feature value of the target file to a locally stored list of feature values of files for the target server, when the feature value of the target file is not in the list of feature values of files.

In an embodiment, after obtaining the list of feature values of files for the target server and determining that the feature value of the target file is not in the list of feature values of files, the router may firstly add the feature value of the target file to the locally stored list of feature values of files for the target server. Based on this processing, after receiving the target file uploaded by the router and updating the list of feature values of files stored in the target server, the target server may transmit the updated list of feature values of files to other routers except for this router.

At step 104, the target server stores the target file and records the target file as an uploading file of a login account of the terminal when the target server receives the target file transmitted by the router; the target server records a target file which is already stored in the target server as the uploading file of the login account of the terminal when the target server receives the feature value of the target file transmitted by the router. Alternatively or additionally, when the user prefers to store a personal copy of the file on the target server, the router or terminal may display a confirmation page and request the user to perform additional acts, which may include paying for the personal copy, verifying passwords, and verifying available personal storage space, etc.

In one or more embodiments, based on different processing of the router, the target server may receive the target file or the feature value of the target file after step 103. On the one hand, when the target server receives the target file transmitted by the router, the target file may be stored in the target server. Meanwhile, the target server may obtain the login account of the terminal which transmits the target file, and then record the target file as an uploading file of the login account. On the other hand, when the target server receives the feature value of the target file transmitted by the router, the target server may determine the target file which is already stored in the target server according to the feature value, and then record the target file as the uploading file of the login account of the terminal.

Alternatively or additionally, after receiving the target file, the target server may update the list of feature values of files. Accordingly, a part of processing at step 104 may be as follows: when receiving the target file, the target server may determine the feature value of the target file, and adds the feature value of the target file to the list of feature values of files which is stored in the target server.

In one or more embodiments, after receiving the target file transmitted by the router, the target server may determine the feature value of the target file, and add the feature value of the target file to the list of feature values of files which is stored in the target server for updating. Meanwhile, the target server may record other related information of the target file in the list of feature values of files, such as a file name, a file size, an uploading time, a login account of the uploading terminal, and so forth.

Alternatively or additionally, the list of feature values of files corresponding to each account may be stored in the target server. Accordingly, a part of processing at step 104 may be as follows: when the target server receives the feature value of the target file transmitted by the router and the feature value of the target file is not in the list of feature values of files which corresponds to the login account of the terminal, the target file which is already stored in the target server is recorded as the uploading file of the login account of the terminal.

In one or more embodiments, a user may register an account for an application program. The target server corresponding to the application program may set a list of feature values of files for each account, for recording the feature values of all files that uploaded from the account. If receiving the feature value of the target file transmitted by the router, the target server may firstly obtain the login account of the terminal, and then look up the list of feature values of files corresponding to the account for the feature value. When the feature value of the target file is not in the list of feature values of files corresponding to the login account of the terminal, it means the target file has been uploaded by other accounts, but not by this account, therefore the target file stored in the target server may be recorded as the uploading file of this login account of the terminal. When the feature value of the target file is in the list of feature values of files corresponding to the login account of the terminal, it means the target file has been uploaded by the account. Therefore, this upload is repetitive, and it is no need to record the target file.

In the embodiments of the present disclosure, a router receives a target file for uploading to a target server which is transmitted from a terminal; determines a feature value of the target file; obtains a list of feature values of files for the target server, in which the feature value of each file stored in the target server is recorded. The router may transmit the target file to the target server, when the feature value of the target file is not in the list of feature values of files. The router may transmit the feature value of the target file to the target server, when the feature value of the target file is in the list of feature values of files. In this way, when a file is uploaded from the terminal to the server, a router may determine whether the file has been already stored in the server according to the feature value of the file and the list of feature values of files for the server, which may prevent users from repeating uploading an exist file in the server, thus saving the resource for file transmission of the server.

Figure 3:
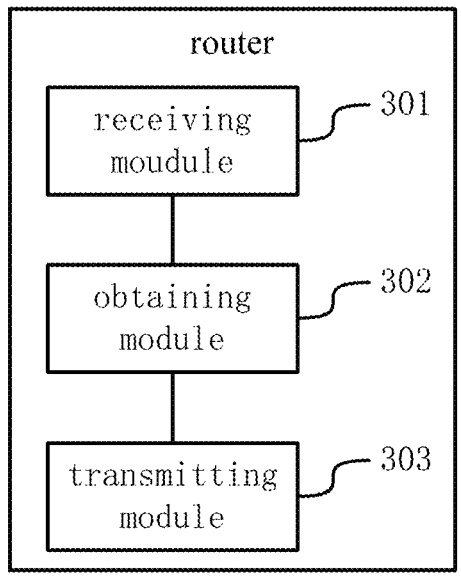
FIG. 3 is a schematic structure diagram illustrating a router according to an exemplary embodiment.

Based on the same technical concept, a router is provided by embodiments of the present disclosure, as shown in FIG. 3, the router including: a receiving module 301 configured to receive a target file for uploading to a target server which is transmitted from a terminal and determine a feature value of the target file; an obtaining module 302 configured to obtain a list of feature values of files for the target server, in which the feature value of each file stored in the target server is recorded; and a transmitting module 303 configured to transmit the target file to the target server when the feature value of the target file is not in the list of feature values of files and transmit the feature value of the target file to the target server, when the feature value of the target file is in the list of feature values of files. The receiving module 301 may include a receiver circuit. The transmitting module 303 may include a transmitter.

Alternatively or additionally, the obtaining module is configured to obtain a locally stored list of feature values of files for the target server.

Figure 4:
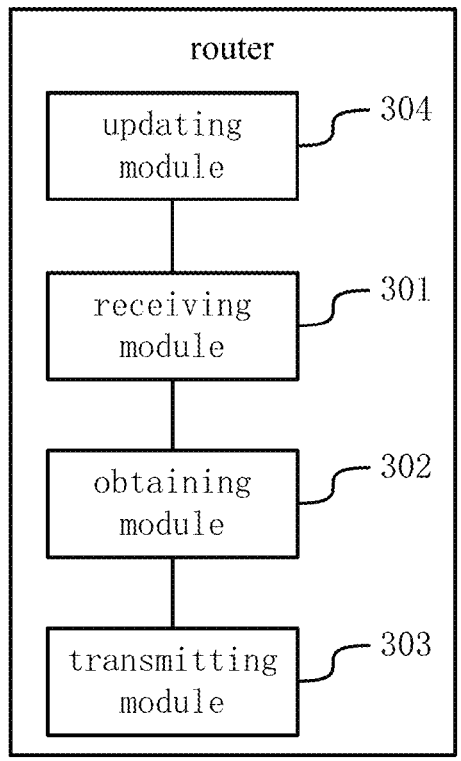
FIG. 4 is a schematic structure diagram illustrating a router according to an exemplary embodiment.

Alternatively or additionally, as shown in FIG. 4, the router further includes an updating module 304 configured to update the locally stored list of feature values of files for the target server according to a list of feature values of files transmitted by the target sever when the router receives the list of feature values of files transmitted by the target server.

Alternatively or additionally, the obtaining module is configured to download a latest list of feature values of files from the target server.

Figure 5:
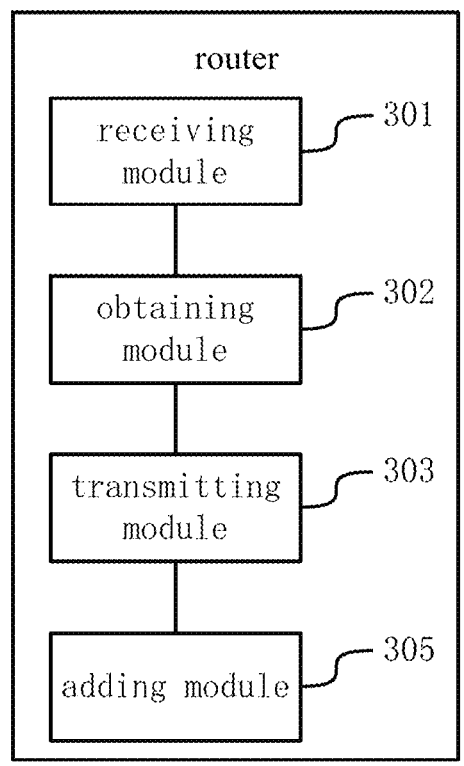
FIG. 5 is a schematic structure diagram illustrating a router according to an exemplary embodiment.

Alternatively or additionally, as shown in FIG. 5, the router further includes an adding module 305, configured to add the feature value of the target file to a locally stored list of feature values of files for the target server, when the feature value of the target file is not in the list of feature values of files.

Figure 6:
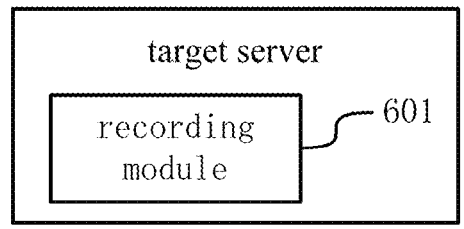
FIG. 6 is a schematic structure diagram illustrating a target server according to an exemplary embodiment.

Based on the same technical concept, a target server is provided by embodiments of the present disclosure, as shown in FIG. 6, the target server including: a recording module 601 configured to store a target file and recording the target file as an uploading file of a login account of a terminal when the target server receives the target file transmitted by a router, and record a target file which is already stored in the target server as the uploading file of the login account of the terminal when the target server receives a feature value of the target file transmitted by the router.

Figure 7:
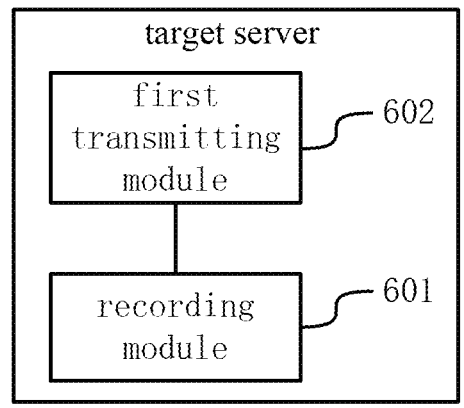
FIG. 7 is a schematic structure diagram illustrating a target server according to an exemplary embodiment.

Alternatively, as shown in FIG. 7, the target server further includes a first transmitter 602 configured to transmit an updated list of feature values of files to the router when a list of feature values of files stored in the target server is updated.

Figure 8:
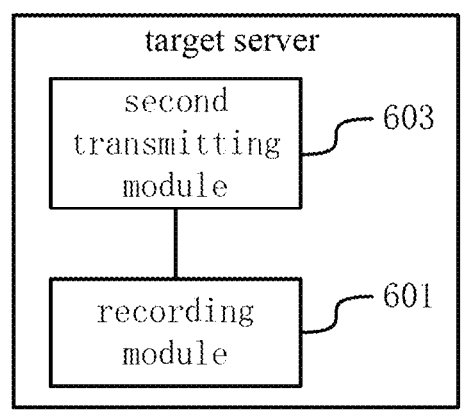
FIG. 8 is a schematic structure diagram illustrating a target server according to an exemplary embodiment.

Alternatively, as shown in FIG. 8, the target server further includes a second transmitter 603 configured to transmit a latest list of feature values of files to the router every pre-defined time period.

Figure 9:
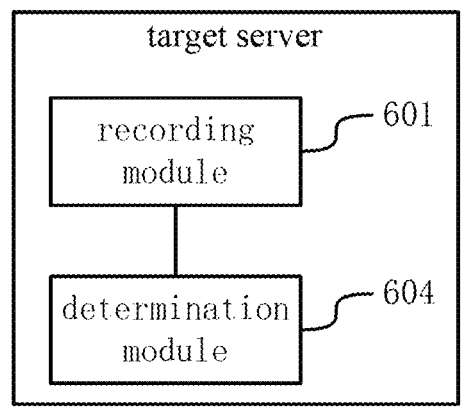
FIG. 9 is a schematic structure diagram illustrating a target server according to an exemplary embodiment.

Alternatively or additionally, as shown in FIG. 9, the target server further includes a determination module 604 configured to determine the feature value of the target file and add the feature value of the target file to a list of feature values of files stored in the target server when the target server receives the target file.

Alternatively or additionally, the recording module 601 is configured to record the target file which is already stored in the target server as the uploading file of the login account of the terminal, when the target server receives the feature value of the target file transmitted by the router and the feature value of the target file is not in a list of feature values of files corresponding to the login account of the terminal.

With respect to the apparatus in the embodiments above, the specific manner in which each module performs the operation has been described in detail in the embodiment relating to the method, and will not be illustrated in detail herein.

In the embodiments of the present disclosure, a router receives a target file for uploading to a target server which is transmitted from a terminal; determines a feature value of the target file; obtains a list of feature values of files for the target server, in which the feature value of each file stored in the target server is recorded; transmits the target file to the target server, when the feature value of the target file is not in the list of feature values of files; and transmits the feature value of the target file to the target server, when the feature value of the target file is in the list of feature values of files. In this way, when a file is uploaded from the terminal to the server, a router may determine whether the file has been already stored in the server according to the feature value of the file and the list of feature values of files for the server, which may prevent users from repeating uploading an exist file in the server, thus saving the resource for file transmission of the server.

It is notable that the apparatus for uploading a file provided by the above-described embodiments is only exemplified by the division of each functional module described above when uploading a file. In practical applications, the function described above may be assigned to be achieved by different function modules based on needs, namely, the internal structure of the apparatus may be divided into different function modules to achieve all or part of the functions described above. Furthermore, the apparatus for uploading a file provided by the embodiment described above and the method for uploading a file belong to the same conception, and the detailed implementation process thereof are with reference to the method embodiments, and will not be described in detail herein.

Based on the same technical concept, a system for uploading a file is provided by another embodiment of the present disclosure, which includes a terminal, a router and a target server. The router is configured to receive a target file for uploading to a target server which is transmitted from a terminal, determine a feature value of the target file, obtain a list of feature values of files for the target server in which the feature value of each file stored in the target server is recorded, transmit the target file to the target server when the feature value of the target file is not in the list of feature values of files, transmit the feature value of the target file to the target server when the feature value of the target file is in the list of feature values of files; and the target server is configured to store a target file and record the target file as an uploading file of a login account of a terminal when a target server receives the target file transmitted by a router; and record a target file which is already stored in the target server as the uploading file of the login account of the terminal when the target server receives a feature value of the target file transmitted by the router.

In the embodiments of the present disclosure, a router receives a target file for uploading to a target server which is transmitted from a terminal; determines a feature value of the target file; obtains a list of feature values of files for the target server, in which the feature value of each file stored in the target server is recorded; transmits the target file to the target server, when the feature value of the target file is not in the list of feature values of files; and transmits the feature value of the target file to the target server, when the feature value of the target file is in the list of feature values of files. In this way, when a file is uploaded from the terminal to the server, a router may determine whether the file has been already stored in the server according to the feature value of the file and the list of feature values of files for the server, which may prevent users from repeating uploading an exist file in the server, thus saving the resource for file transmission of the server.

Figure 10:
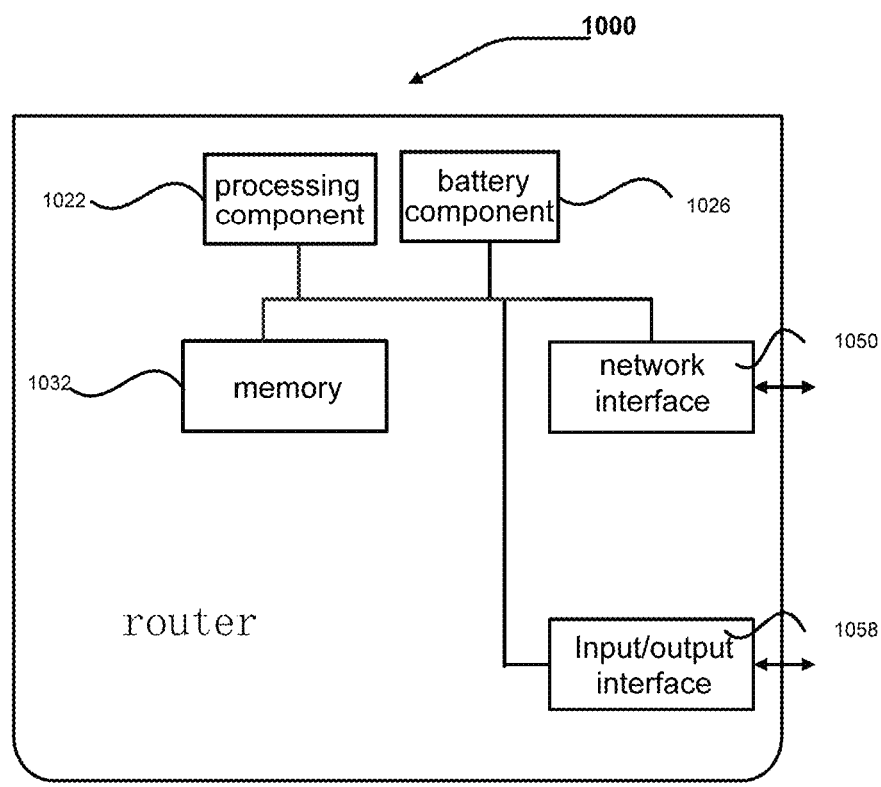
FIG. 10 is a schematic structure diagram illustrating a router according to an exemplary embodiment.

Referring to FIG. 10, another exemplary embodiment further illustrates a schematic structure diagram of a router. A router 1000 includes a processing component 1022, and it further includes one or more processors, and memory resource represented by a memory 1032, which is used to store instructions executable by the processing component 1022, such as an application program. The application program stored in the memory 1032 may include one or more modules, each of which corresponds to a set of instructions. Furthermore, the processing component 1022 is configured to execute instructions to perform the method for displaying a usage record described above.

The router 1000 may further include one battery component 1026 which is configured to perform the battery management of the router 1000, one wired or wireless network interface 1050 which is configured to connect the router 1000 to a network, and one input/output (I/O) interface 1058. The router 1000 may operate a system stored in the memory 1032, such as Windows Server™, Mac OS X™, Unix™, Linux™, FreeBSD™ or the like.

In exemplary embodiments, the router 1000 may be implemented by one or more circuitries, which include application specific integrated circuits (ASIC), digital signal processors (DSP), digital signal processor devices (DSPD), programmable logic devices (PLD), field programmable gate arrays (FPGA), controllers, micro controllers, microprocessors, or other electronic elements. The router 1000 may use the circuitries in combination with the other hardware or software components for executing the method above. Each module, submodule, unit, or sub-unit disclosed above may be implemented at least partially using the one or more circuitries.

The router 1000 may include a memory and one or more programs, where the one or more programs are stored in the memory, and after configuration, the one or more programs executed by one or more processors include instructions to perform the following operations: receiving a target file for uploading to a target server which is transmitted from a terminal; determining a feature value of the target file; obtaining a list of feature values of files for the target server, in which the feature value of each file stored in the target server is recorded; transmitting the target file to the target server, when the feature value of the target file is not in the list of feature values of files; and transmitting the feature value of the target file to the target server, when the feature value of the target file is in the list of feature values of files.

Alternatively, obtaining a list of feature values of files for the target server comprises: obtaining a locally stored list of feature values of files for the target server.

Alternatively, the method further includes the router: updating the locally stored list of feature values of files for the target server according to a list of feature values of files transmitted by the target sever when the router receives the list of feature values of files transmitted by the target server.

Alternatively, obtaining a list of feature values of files for the target server includes downloading a latest list of feature values of files from the target server.

Alternatively, the method further includes the router: adding the feature value of the target file to a locally stored list of feature values of files for the target server, when the feature value of the target file is not in the list of feature values of files.

In the embodiments of the present disclosure, a router receives a target file for uploading to a target server which is transmitted from a terminal; determines a feature value of the target file; obtains a list of feature values of files for the target server, in which the feature value of each file stored in the target server is recorded; transmits the target file to the target server, when the feature value of the target file is not in the list of feature values of files; and transmits the feature value of the target file to the target server, when the feature value of the target file is in the list of feature values of files. In this way, when a file is uploaded from the terminal to the server, a router may determine whether the file has been already stored in the server according to the feature value of the file and the list of feature values of files for the server, which may prevent users from repeating uploading an exist file in the server, thus saving the resource for file transmission of the server.

Figure 11:
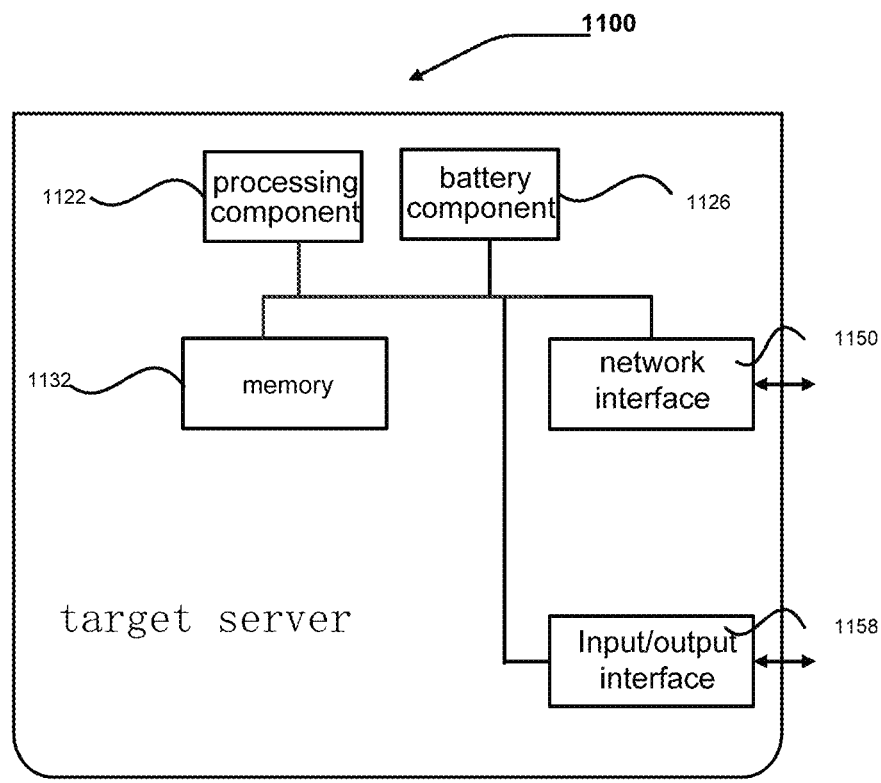
FIG. 11 is a schematic structure diagram illustrating a target server according to an exemplary embodiment.

Referring to FIG. 11, another exemplary embodiment further illustrates a schematic structure diagram of a target server. A target server 1100 includes a processing component 1122, and it further includes one or more processors, and memory resource represented by a memory 1132, which is used to store instructions executable by the processing component 1122, such as an application program. The application program stored in the memory 1132 may include one or more modules, each of which corresponds to a set of instructions. Furthermore, the processing component 1122 is configured to execute instructions to perform the method for displaying a usage record described above.

The target server 1100 may further include one battery component 1126 which is configured to perform the battery management of the target server 1100, one wired or wireless network interface 1150 which is configured to connect the target server 1100 to a network, and one input/output (I/O) interface 1158. The target server 1100 may operate a system stored in the memory 1132, such as Windows Server™, Mac OS X™, Unix™, Linux™, FreeBSD™ or the like.

The target server 1100 may include a memory and one or more programs, where the one or more programs are stored in the memory, and after configuration, the one or more programs executed by one or more processors include instructions to perform the following operations: storing a target file and recording the target file as an uploading file of a login account of a terminal when the target server receives the target file transmitted by a router; and recording a target file which is already stored in the target server as the uploading file of the login account of the terminal when the target server receives a feature value of the target file transmitted by the router.

In exemplary embodiments, the server 1100 may be implemented by one or more circuitries, which include application specific integrated circuits (ASIC), digital signal processors (DSP), digital signal processor devices (DSPD), programmable logic devices (PLD), field programmable gate arrays (FPGA), controllers, micro controllers, microprocessors, or other electronic elements. The server 1100 may use the circuitries in combination with the other hardware or software components for executing the method above. Each module, submodule, unit, or sub-unit disclosed above may be implemented at least partially using the one or more circuitries.

Alternatively or additionally, the method further includes the target server: transmitting an updated list of feature values of files to the router when a list of feature values of files stored in the target server is updated.

Alternatively or additionally, the method further includes the target server: transmitting a latest list of feature values of files to the router every pre-defined time period.

Alternatively or additionally, the method further includes the target server: determining the feature value of the target file and adding the feature value of the target file to a list of feature values of files stored in the target server when the target server receives the target file.

Alternatively or additionally, recording a target file which is already stored in the target server as the uploading file of the login account of the terminal when the target server receives a feature value of the target file transmitted by the router includes: recording the target file which is already stored in the target server as the uploading file of the login account of the terminal, when the target server receives the feature value of the target file transmitted by the router and the feature value of the target file is not in a list of feature values of files corresponding to the login account of the terminal.

In the embodiments of the present disclosure, a router receives a target file for uploading to a target server which is transmitted from a terminal; determines a feature value of the target file; obtains a list of feature values of files for the target server, in which the feature value of each file stored in the target server is recorded; transmits the target file to the target server, when the feature value of the target file is not in the list of feature values of files; and transmits the feature value of the target file to the target server, when the feature value of the target file is in the list of feature values of files. In this way, when a file is uploaded from the terminal to the server, a router may determine whether the file has been already stored in the server according to the feature value of the file and the list of feature values of files for the server, which may prevent users from repeating uploading an exist file in the server, thus saving the resource for file transmission of the server.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the disclosure will be apparent to those skilled in the art from consideration of the specification and practice of the disclosures herein. This application is intended to cover any variations, uses, or adaptations of the disclosure following the general principles thereof and including common sensor customary technical means in the art that is not disclosed in the disclosure. It is intended that the specification and examples be considered as exemplary only, with a true scope and spirit of the disclosure being indicated by the following claims.

It will be appreciated that the inventive concept is not limited to the exact construction that has been described above and illustrated in the accompanying drawings, and that various modifications and changes may be made without departing from the scope thereof. It is intended that the scope of the invention is only limited by the appended claims.

What is claimed is:

1. A method for uploading a file, comprising:
   receiving, by a router, a target file for uploading to a target server which is transmitted from a terminal;
   determining, by the router, a feature value of the target file;
   obtaining, by the router, a list of feature values of files for the target server, in which the feature value of each file stored in the target server is recorded;
   transmitting, by the router, the target file to the target server, when the feature value of the target file is not in the list of feature values of files;
   transmitting, by the router, the feature value of the target file to the target server, when the feature value of the target file is in the list of feature values of files,
   when the target server receives the target file transmitted by the router, storing, by the target server, the target file and recording, by the target server, the target file as an uploading file of a login account of the terminal; and
   when the target server receives the feature value of the target file transmitted by the router, recording, by the target server, a target file corresponding to the received feature value which is already stored in the target server as the uploading file of the login account of the terminal,
   wherein a list of feature values of files corresponding to each account is stored in the target server;
   wherein when the target server receives the feature value of the target file transmitted by the router, recording, by the target server, the target file corresponding to the received feature value which is already stored in the target server as the uploading file of the login account of the terminal comprises:
      when the target server receives the feature value of the target file transmitted by the router and the feature value of the target file is not in a list of feature values of files which corresponds to the login account of the terminal, recording, by the target server, the target file which is already stored in the target server as the uploading file of the login account of the terminal.

2. The method of claim 1, wherein obtaining a list of feature values of files for the target server comprises:
   obtaining a list of feature values of files for the target server, wherein the list of feature values is stored locally at the target server.

3. The method of claim 2, further comprising the router:
   updating, by the router, the list of feature values of files for the target server according to a list of feature values of files transmitted by the target sever when the router receives the list of feature values of files transmitted by the target server.

4. The method of claim 1, wherein obtaining a list of feature values of files for the target server comprises:
   downloading a latest list of feature values of files from the target server.

5. The method of claim 1, further comprising the router:
   adding, by the router, the feature value of the target file to a list of feature values of files for the target server, when the feature value of the target file is not in the list of feature values of files.

6. A router, comprising:
   a processor;
   a memory for storing processor-executable instructions;
   wherein the processor is configured to:
   receive a target file for uploading to a target server which is transmitted from a terminal and determine a feature value of the target file;
   obtain a list of feature values of files for the target server, in which the feature value of each file stored in the target server is recorded;
   transmit the target file to the target server when the feature value of the target file is not in the list of feature values of files and transmit the feature value of the target file to the target server, when the feature value of the target file is in the list of feature values of files;
   when the target server receives the target file transmitted by the router, store the target file and record the target file as an uploading file of a login account of the terminal; and
   when the target server receives the feature value of the target file transmitted by the router, record a target file corresponding to the received feature value which is already stored in the target server as the uploading file of the login account of the terminal,
   wherein a list of feature values of files corresponding to each account is stored in the target server;
   wherein when the target server receives the feature value of the target file transmitted by the router, recording, by the target server, the target file corresponding to the received feature value which is already stored in the target server as the uploading file of the login account of the terminal comprises:
      when the target server receives the feature value of the target file transmitted by the router and the feature value of the target file is not in a list of feature values of files which corresponds to the login account of the terminal, recording, by the target server, the target file which is already stored in the target server as the uploading file of the login account of the terminal.

7. The router of claim 6, wherein the processor is further configured to:
   obtain a list of feature values of files for the target server, wherein the list of feature values is stored locally at the target server.

8. The router of claim 7, wherein the processor is further configured to:
   update the list of feature values of files for the target server according to a list of feature values of files transmitted by the target sever when the router receives the list of feature values of files transmitted by the target server.

9. The router of claim 6, wherein the processor is further configured to:
   download a latest list of feature values of files from the target server.

10. The router of claim 6, wherein the processor is further configured to:
    add the feature value of the target file to a list of feature values of files for the target server, when the feature value of the target file is not in the list of feature values of files.

* * * * *